Sept. 18, 1962 C. L. GRAYBILL 3,054,298
AUTOMATIC VARIABLE SPEED TRANSMISSION
Filed March 7, 1960 3 Sheets-Sheet 3
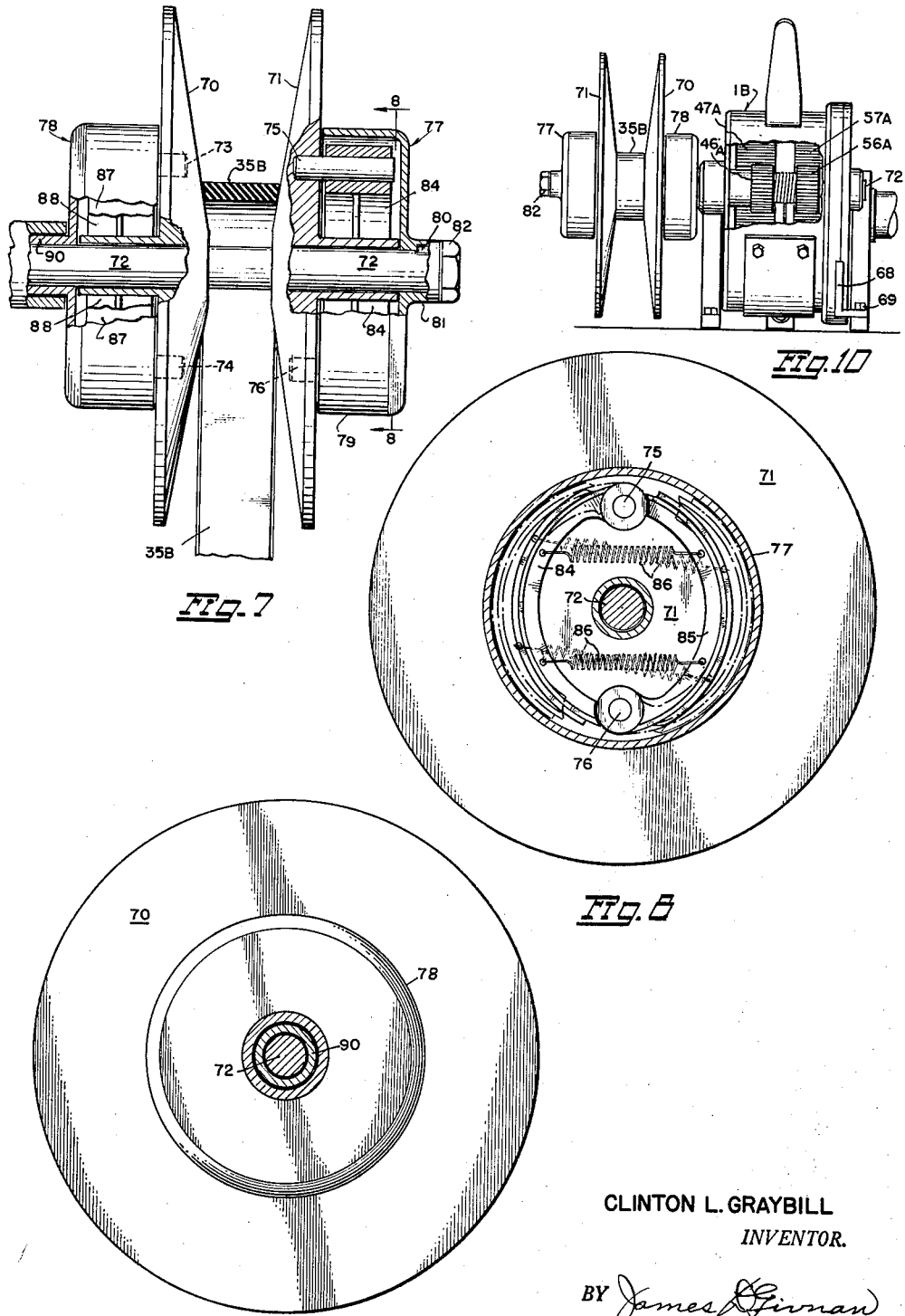
CLINTON L. GRAYBILL
*INVENTOR.*
BY James D. Girman
ATT'Y United States Patent Office 3,054,298
Patented Sept. 18, 1962

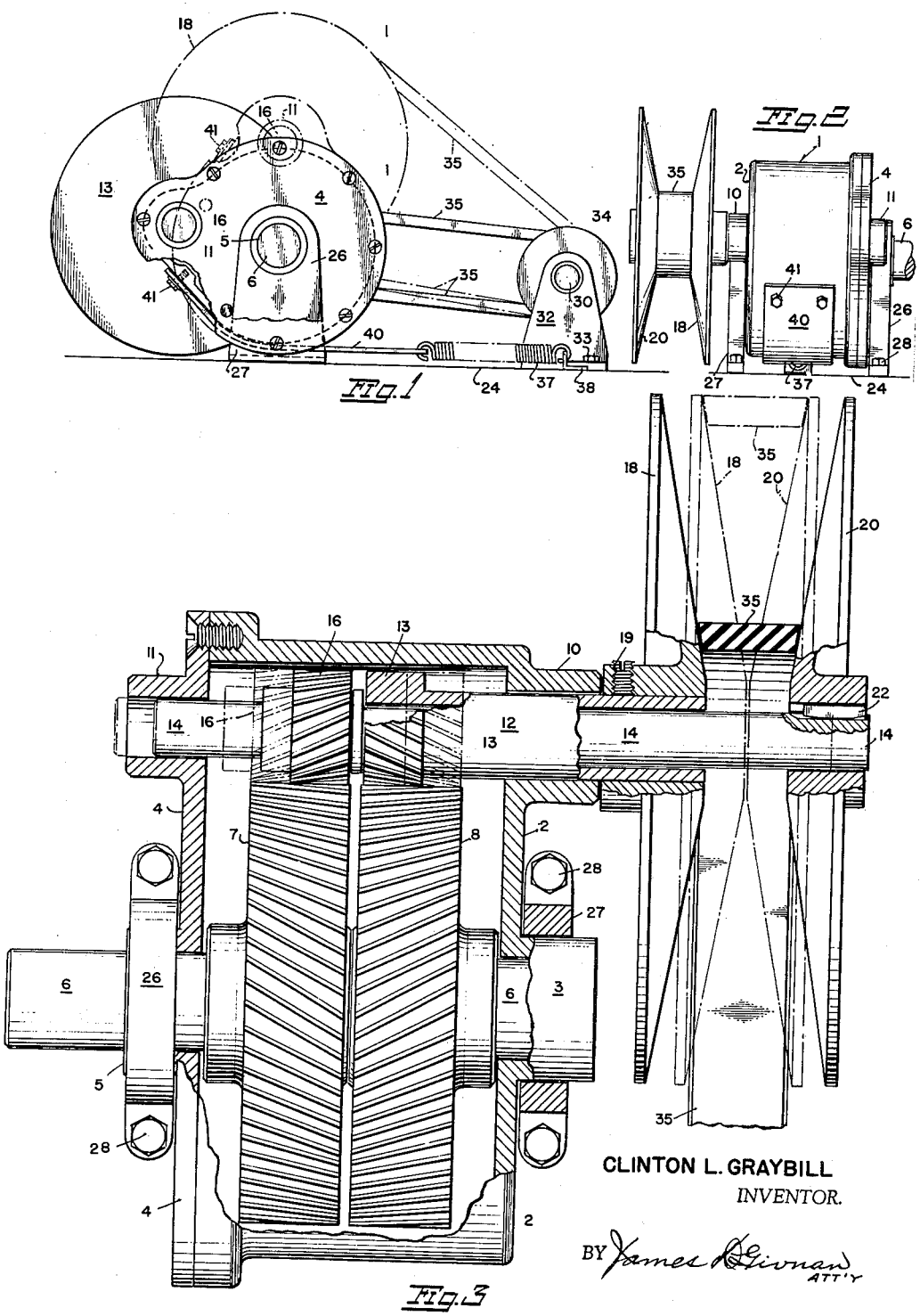

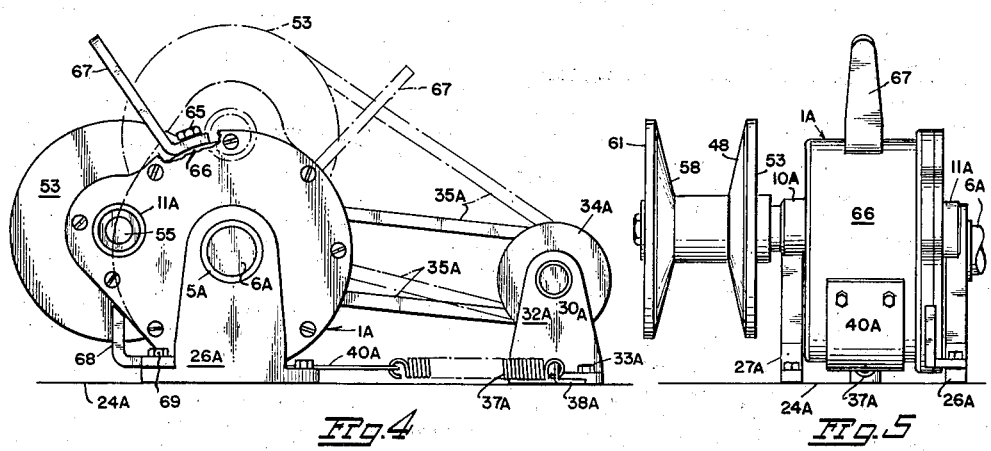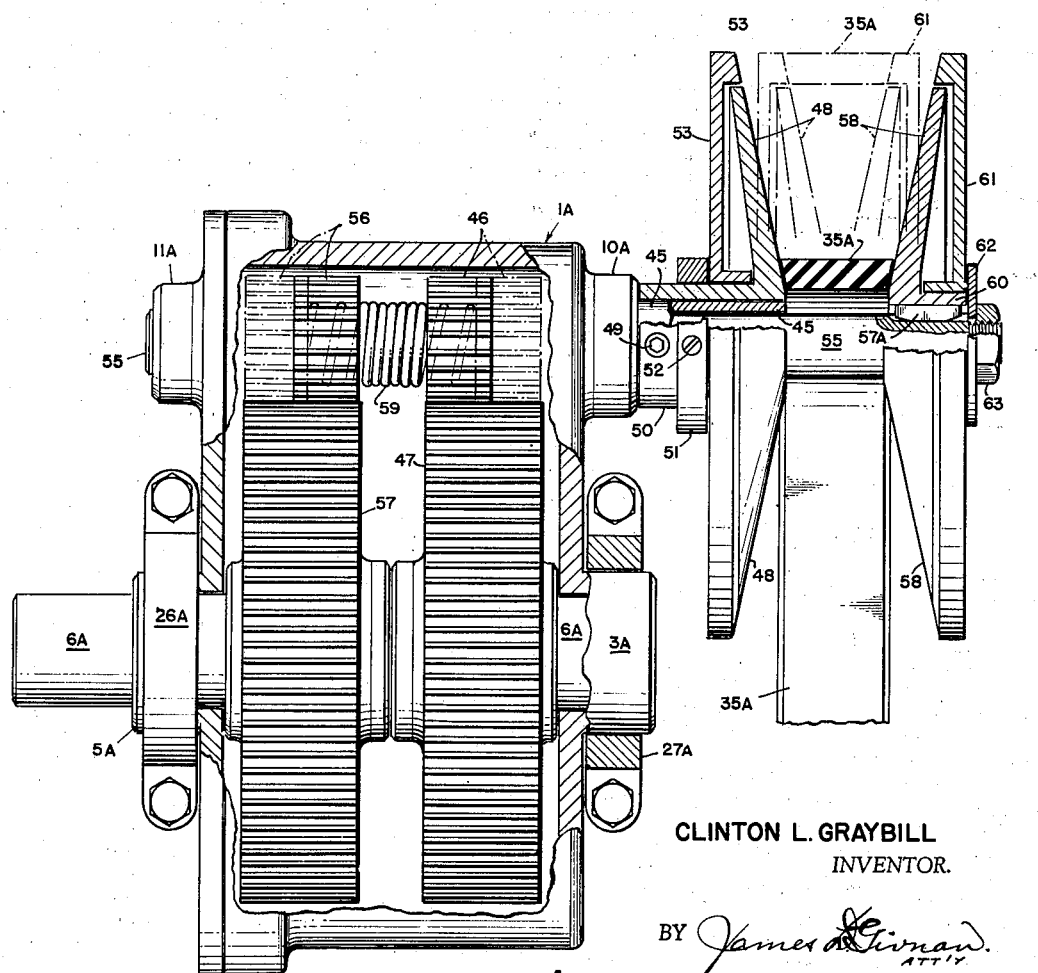

3,054,298
AUTOMATIC VARIABLE SPEED TRANSMISSION
Clinton L. Graybill, Superior, Mont., assignor to Graybill Industries, Inc., Superior, Mont., a corporation of Montana
Filed Mar. 7, 1960, Ser. No. 13,262
1 Claim. (Cl. 74—230.17)

This invention relates generally to power transmission mechanisms and more particularly, though not restrictively, to an automatic drive adapted for use on light weight vehicles driven by low powered engines of the internal combustion type.

One of the principal objects of the invention is to transmit power from a drive shaft to a driven shaft and automatically to alter the speed at which the driven shaft rotates in direct proportion to the load imposed upon the engine.

Another object is to effect a reduction of the speed at which the driven shaft rotates as the effort exerted by the engine increases and automatically to increase the speed of rotation of the driven shaft when the effort exerted by the engine is decreased.

A further object is to provide gearing between a driving shaft and a driven shaft utilizing automatically adjustable frictional controlling means to effect changes in the transmitted motion whereby only a relatively small portion of the transmitted torque is imposed on the frictional drive thereby permitting the use of relatively small frictional elements. To further minimize the torque imposed on the frictional elements, said elements in accordance with my invention are utilized at the high speed end of the transmission where the torque is at the minimum.

Among its features my invention embodies a solid shaft rotatable and slidable within a hollow shaft, each provided at one end with pinion gears slidably enmeshed at all times with driven gears secured to a driven shaft, cooperating normally urged apart cone pulley flanges secured to the opposite end of said solid and hollow shafts and a driving belt wedgingly entrained over said pulley flanges to thereby automatically change effective pulley diameters from minimum to maximum in direct proportion to the torque load imposed upon the engine.

The foregoing and other objects and advantages which will become subsequently apparent reside in the details of construction and operation as more fully hereinafter described and claimed, reference being had to the accompanying drawings forming a part hereof wherein like numerals refer to like parts throughout and in which:

FIGURE 1 is a side elevational view of an automatic transmission constructed in accordance with this invention and with fragments broken away for clearness of illustration.

FIGURE 2 is an elevation as viewed from the left of FIGURE 1.

FIGURE 3 is a top plan view of FIGURE 1 on an enlarged scale with parts omitted and fragments broken away to show internal parts.

FIGURES 4, 5 and 6 are views similar, respectively, to FIGURES 1, 2 and 3 showing a modified form of the invention.

FIGURE 7 is an elevational detail view of cooperating cone pulley flanges and associated clutch mechanisms, with fragments broken away and parts in section.

FIGURE 8 is a sectional view taken approximately along the line 8—8 of FIGURE 7.

FIGURE 9 is an elevational view of the opposite end of FIGURE 7, and

FIGURE 10 is an end elevational view of the modified form of FIGURE 5, provided with the modification of FIGURE 7.

With continuing reference to the drawings and particularly FIGURES 1 to 3 thereof, reference numeral 1 indicates generally a gear casing of generally circular form, permanently closed at one of its ends by an end wall 2 provided with a bearing 3 and at its opposite end by a closure plate 4 provided with a bearing 5. Within these aligned bearings a power takeoff shaft 6 is journalled and to this shaft a pair of right and left spiral gears 7 and 8 are keyed or otherwise secured in any suitable manner for rotation with the shaft.

The end wall 2 is provided with a second bearing 10 aligned with a second bearing 11 provided in the cover plate 4. Slidably and rotatably mounted in the bearing 10 is a hollow shaft 12 provided at its inner end with a spiral pinion gear 13 enmeshed at all times with the gear 8. Slidably and rotatably mounted in the bearing 11 is a solid shaft 14 also provided on its inner end with a spiral pinion gear 16 enmeshed at all times with the gear 7.

The inner flange 18 of a cone pulley is secured as at 19 to the outer end of the hollow shaft 12 and a companion outer flange 20 is keyed or otherwise suitably secured as at 22 to the outer end of the solid shaft 14. From the foregoing it will be apparent that the flanges are readily movable toward and away from each other as indicated in broken and full lines in FIGURE 3 under certain operational conditions which will be more fully hereinafter pointed out.

The invention is illustrated as embodied in a mechanism adapted, though not restrictively, for use in connection with a light weight automobile driven by a low powered internal combustion engine (not shown), and wherein for example a chassis member of the automobile is indicated at 24 and upon this member the gear casing 1 is rockably mounted by the shaft 6 extending through trunnions 26—27 secured as at 28 to the chassis member. A drive shaft 30 is journalled in bearing blocks 32 secured as at 33 to the chassis member 24. This shaft may be advantageously coupled to the shaft of an engine (not shown) or other prime mover for the vehicle by any suitable manually operable clutching mechanism (also not shown).

A V-pulley 34 is secured to the drive shaft 30 and entrained over this pulley and the cone pulley is a V-belt 35. To insure proper tension on the belt throughout its operative range, I provide a tension spring 37 whose one end is secured as at 38 to the chassis member 24, or to the bearing block 32 if desired, and whose other end is attached to one end of a strap 40 whose opposite end is secured as at 41 to the gear casing 1.

In the modification shown in FIGURES 4–6, the gear casing 1A, its rockable mounting by bearings 3A and 5A, in trunnions 26A—27A secured to an automobile chassis member 24A, tensioning means 37A, 38A and 40A, shaft 6A and bearings 10A and 11A are the same as those shown and described in the first form of the invention. Slidably and rotatably mounted in the bearing 10A is a hollow tubular shaft 45 provided at its inner end with a pinion gear 46 enmeshed at all times with a spur gear 47 keyed or otherwise suitably secured to the shaft 6A. The outer end of the hollow shaft 45 is provided with an inner flange 48 of a cone pulley secured thereto by a set screw 49 extending through the flange hub 50. Freely rotatable about the flange hub, and positioned thereon by a collar 51 secured to the flange hub as at 52, is an idling disc 53.

Slidably and rotatably mounted in the bearing 11A is a solid shaft 55 to which is secured a pinion gear 56 enmeshed at all times with a spur gear 57 also secured to the shaft 6A. The solid shaft 55 is journalled through the hollow shaft 45 and to its outer end is secured by a key 57A a companion cone pulley flange 58. A compression spring 59 coiled about the shaft 55 and disposed between the pinion gears 46 and 56 normally urges those gears away from each other as shown in broken lines in FIGURE 6, and as a consequence thereof urges the pulley flanges 48 and 58 toward each other also as shown in broken lines.

Freely rotatable about the hub 60 of the flange 58 is an idling disc 61 positioned on the shaft 55 by a washer 62 and nut 63 on the outermost threaded end of the solid shaft 55. Secured as at 65 to the peripheral wall 66 of the gear casing 1A is a shifting lever 67 whose purpose will become apparent in the operational description to follow. A limit stop 68 is secured as at 69 to the bearing block 26A and its purpose is to prevent the shafts 55, 6A and 30A from coming into dead center horizontal alignment. From the foregoing, it will be apparent that by moving the shifting lever 67 to the right or from the full line position toward the broken line position shown in FIGURE 4, the effective diameter of the pulley flanges 49 and 58 will be increased and thereby reduce the speed of rotation of the pinion gears 46 and 56 and their respective spur gears 47 and 57 and that movement of the shifting lever to its limit into the broken line position shown in FIGURE 4 will cause the belt 35A to ride on the outer rims of the idling disks 53 and 61 as shown in broken lines in FIGURE 6. Then, movement of the shifting lever in the opposite direction or to the left as viewed in FIGURE 4 will cause the belt 35A to reengage the pulley flanges 45 and 58 and thereafter the engine r.p.m. will remain more or less constant during increasing loads on the power take-off shaft 6A since the increased torque required to overcome such increasing loads is provided instantaneously by the relative movement of the cone pulley flanges 48 and 58.

As in the embodiment of FIGURE 1 a V-belt 35A is entrained over the cone pulley and over a driving pulley 34A secured to the drive shaft 30A journalled in bearing blocks 32A secured to the chassis member as at 33A.

In the further modification shown in FIGURES 7–9, the cone pulley flanges 70 and 71, up to a certain speed of rotation are freely rotatable about the solid shaft 72 and each is provided with diametrically opposed outwardly extending pins 73—74 and 75—76, respectively, for cooperation with two substantially identical centrifugal clutch mechanisms indicated generally at 77 and 78. The clutch mechanism 77 comprises a drum 79 keyed as at 80 by its hub 81 to the solid shaft 72 and backed by a nut 82. Disposed within the drum 79 and swingably attached to the pins 75 and 76, respectively, are two friction shoes 84 and 85 interconnected by tension springs 86 to normally hold the shoes in the retracted full line position shown.

The pins 73 and 74 are similarly provided with yieldingly interconnected friction shoes 87 and 88 disposed within and cooperating with the inner periphery of the drum 78. This drum is integrated concentrically with the outer end of a hollow tubular shaft 90 whose inner end is provided with the pinion gear 46A (FIGURE 10) meshing at all times with the spur gear 47A. The solid shaft 72 is journalled in the hollow shaft 90, as aforesaid, and its inner end is provided with the pinion gear 56A enmeshed at all times with the spur gear 57A. A compression spring 59A is interposed between the pinion gears 46A and 56A to normally urge them and their respective pulleys apart as in FIGURE 6. It will be readily understood, of course, that if desired the inner ends of said hollow and solid shafts may be provided with the spiral gears for the same purpose shown and described in FIGURES 1–3.

The operation of the invention as shown in FIGURES 1–3 is as follows:

Assuming shaft 30 and pulley 34, as viewed in FIGURE 1, are being driven in a clockwise direction by an engine or other prime mover and that a torque load on the shaft 6 is reacting through the shaft and its related parts and belt 35 against the rotation of pulley 34 and gears 16, 7 and 13, 8, then because of the characteristic of a flat belt to climb to the crown of a pulley, so also will the V-belt 35 climb the opposing faces of the inner and outer cone pulley flanges 18 and 20 as flange 20 is drawn inwardly by the outward camming of its spiral spur gear 16 relative to the spiral driven gear 7 and flange 18 is forced outwardly by the camming action of its spiral spur gear 13 relative to the spiral driven gear 8. These compressive forces against the sides of the V-belt and the climbing of the belt as it pulls the gear casing 1 upwardly about the fulcrum 6 will continue as long as there is a torque load on the shaft 6.

Thus the r.p.m. of the engine will remain substantially constant during increasing loads on the shaft 6 since increased torque required to overcome such increasing loads is afforded instantaneously by the relative movement of the cone pulley flanges.

The operation of the cone pulley flanges 48 and 58, belt drive 34A—35A, gear casing 1A, and the tensioning means 40A and 37A is the same in the modification shown in FIGURES 4–6 as the operation of the corresponding parts in the first form of the invention. In addition thereto, the gear casing may be swung by the shifting lever 67 from the full line position to the broken line position, as shown in FIGURE 4, to position the V-belt 35A between the rims of the idling discs 53 and 61 in a neutral position out of reach of the cone pulley flanges 48 and 58, as shown in FIGURE 6. The casing may be returned by the shifting lever to belt-pulley reengagement by the shifting lever 67, or upon release of the lever the tensioning means 40A and 37A can be relied upon to resume such engagement.

In applying the modification of the invention shown in FIGURES 7–10 to the modification shown in FIGURES 4–6, the idling discs 53 and 61 in the latter are dispensed with, and the driving or idling operation of the cone pulley flanges 70 and 71 is automatically controlled by the clutching mechanisms 77 and 78. In FIGURE 7 the cone pulley flanges are shown in an idling position wherein the friction shoes 84—85 (see also FIGURE 8) and 87—88 are held away from their respective drums 77—78 by the tension springs 86 and will continue to be so held until centrifugal force throws the friction shoes outwardly into engagement with their respective drums when a predetermined speed of rotation is reached.

Here, as in the form of the invention shown and described in FIGURES 4–6, the change of the effective diameter of the pulley flanges 70 and 71 will be automatic at speeds of rotation less than that required to throw the friction shoes 84 and 85 into engagement with their respective drums 77—78.

Similarly when the load on shaft 6 is reduced as in traveling along a straightaway, the engine speed will not vary because of the automatic movement of the cone pulley flanges away from each other into the full line position shown in FIGURES 1 and 3 where the ratio between the driving pulley 34 and cone pulley is 1:1.

While I have shown particular forms of embodiment of my invention, I am aware that many minor changes therein will readily suggest themselves to others skilled in the art without departing from the spirit and scope of the invention. Having thus described my invention what I claim as new and desire to protect by Letters Patent is:

A variable speed power transmission operable by a driving pulley rotatably mounted upon a support and adapted for selective coupling to a prime mover, said power transmission comprising a gear casing, means mounting the casing upon said support for movement toward and away from said driving pulley, a pair of driven spiral gears rotatably mounted within the casing and secured to a power output shaft journalled in the casing and extending outwardly therefrom, a hollow shaft slidably and rotatably mounted in one side of the casing and provided at its inner end with a spiral pinion gear slidably enmeshed at all times with one of said driven gears within the casing, a solid shaft slidably and rotatably mounted within said hollow shaft and extending to the interior of said casing and journalled in the opposite side thereof, said solid shaft provided with a companion pinion gear slidably enmeshed at all times with the other of said spiral driven gears within the casing, a cone pulley comprising a first pulley flange secured to the outer end of said solid shaft and a second pulley flange secured to the outer end of said hollow shaft, an endless belt entrained over said pulley flanges and over said driving pulley whereby camming movement of said spiral pinion gears relative to their respective driven spiral gears during varying torque loads on said power output shaft will urge said pulley flanges into various degrees of spaced apart relationship and as a consequence thereof the effective diameters of said cone pulleys will automatically vary in accordance with variations in said torque loads.

References Cited in the file of this patent

UNITED STATES PATENTS

| | | |
|---|---|---|
| 1,972,377 | De Laderriere | Sept. 4, 1934 |
| 2,175,047 | Acker | Oct. 3, 1939 |
| 2,479,764 | Morton et al. | Aug. 23, 1949 |
| 2,612,054 | Davis | Sept. 30, 1952 |
| 2,658,399 | Mercier | Nov. 10, 1953 |
| 2,792,712 | Gibson | May 21, 1957 |

FOREIGN PATENTS

| | | |
|---|---|---|
| 542,416 | Great Britain | Jan. 8, 1942 |